(12) United States Patent
Dunlop et al.

(10) Patent No.: US 7,570,944 B2
(45) Date of Patent: Aug. 4, 2009

(54) DYNAMIC SELECTION OF RADIO COMMUNICATION NETWORK OPERATOR OR SERVICE PROVIDER

(75) Inventors: John Dunlop, Glasgow (GB); Demessie Girma, Glasgow (GB); James Menzies Irvine, Troon Ayrshire (GB); Gwenael Le Bodic, Puteaux (FR)

(73) Assignee: University of Strathclyde, Glasgow (GB)

( * ) Notice: Subject to any disclaimer, the term of this patent is extended or adjusted under 35 U.S.C. 154(b) by 0 days.

(21) Appl. No.: 10/240,516

(22) PCT Filed: Apr. 17, 2001

(86) PCT No.: PCT/GB01/01813

§ 371 (c)(1),
(2), (4) Date: Feb. 21, 2004

(87) PCT Pub. No.: WO01/80589

PCT Pub. Date: Oct. 25, 2001

(65) Prior Publication Data

US 2004/0198356 A1    Oct. 7, 2004

(51) Int. Cl.
*H04M 3/42* (2006.01)
(52) U.S. Cl. .............. 455/414.1; 455/552.1; 370/259; 379/228
(58) Field of Classification Search .............. 455/414.1, 455/414.3, 414.4, 452.2, 552.1; 370/259, 370/329, 341; 709/227, 219, 249, 229, 228
See application file for complete search history.

(56) References Cited

U.S. PATENT DOCUMENTS

| 5,613,204 | A |  | 3/1997 | Haberman et al. |
| 5,675,636 | A |  | 10/1997 | Gray |
| 5,825,759 | A |  | 10/1998 | Liu |
| 5,915,214 | A |  | 6/1999 | Reece et al. |
| 5,950,130 | A |  | 9/1999 | Coursey |
| 6,069,882 | A | * | 5/2000 | Zellner et al. ................ 370/329 |
| 6,091,963 | A | * | 7/2000 | Mannerstr.ang.le et al. ...... 455/552.1 |
| 6,148,197 | A |  | 11/2000 | Bridges et al. |
| 6,356,638 | B1 | * | 3/2002 | Hardy et al. ................. 380/275 |
| 6,400,946 | B1 | * | 6/2002 | Vazvan et al. ............. 455/462.1 |
| 6,463,286 | B1 | * | 10/2002 | Salminen ..................... 455/453 |
| 6,522,658 | B1 | * | 2/2003 | Roccanova ................... 370/441 |

(Continued)

FOREIGN PATENT DOCUMENTS

WO    WO-96/28947    9/1996

(Continued)

OTHER PUBLICATIONS

International Search Report for PCT/GB01/01813 completed Aug. 13, 2001.

*Primary Examiner*—Nghi H Ly
(74) *Attorney, Agent, or Firm*—Alston & Bird LLP

(57) ABSTRACT

The present invention relates to a communications environment comprising a digital marketplace arrangement which enables user to have dynamic access to a variety of network operators and service operators which are registered with the marketplace. The users can communicate with the digital marketplace via a logical market channel enabling user, service providers and network operators to interact in real time and negotiate for appropriate communication links and quality of service. Each communications environment may comprise more than one digital marketplace.

20 Claims, 10 Drawing Sheets

U.S. PATENT DOCUMENTS

| | | | |
|---|---|---|---|
| 6,674,733 B1 * | 1/2004 | Huusko | 370/329 |
| 6,741,848 B2 * | 5/2004 | Timonen et al. | 455/405 |
| 6,801,519 B1 * | 10/2004 | Mangal | 370/349 |
| 6,801,777 B2 * | 10/2004 | Rusch | 455/452.2 |
| 6,823,389 B1 * | 11/2004 | Satomi et al. | 709/227 |
| 7,039,025 B1 * | 5/2006 | Menon et al. | 370/328 |

FOREIGN PATENT DOCUMENTS

| WO | WO 99/11051 A1 | 3/1999 |
|---|---|---|

* cited by examiner

RM: Resource Manager
MAC: Medium Access Control
SA: Service Agent (Agent belonging to the Service Provider)
NA: Network Agent (Agent belonging to the Network Operator)

DYNAMIC SELECTION OF RADIO COMMUNICATION NETWORK OPERATOR OR SERVICE PROVIDER

BACKGROUND OF THE INVENTION

1. Field of the Invention

This invention relates to communication services in wireless networks, particularly where users are mobile.

2. Description of Related Art

In existing communication systems, users are associated with a Home Network owned by the network operators with whom the user has a subscription agreement. This subscription agreement is an essentially fixed agreement arranged with the network operators, which commits the user to using the services provided by these network operators for a lengthy duration, such as twelve months. Whilst committed to their chosen network operators by the subscription agreement, the user must utilise their chosen network operator's service for each communication session, regardless of whether they are communicating with another user in the same building or another user in a different country.

WO 96/28947 describes an arrangement that addresses some of the problems with existing communications networks. In this, mobile telephones can operate and establish connections over several mobile telephone communication networks, the selection of the network being determined by the mobile telephone on the basis of parameters such as cost, capacity, transmission speed and availability.

U.S. Pat. No. 5,915,214 describes another system and method for enabling amuser of wireless communication services to switch among service providers based on cost and service feature information. In this the mobile telephones are adapted to receive pricing information from network operators and select the best deal on the basis of that information. Although this arrangement provides a mechanism for finding a service based on cost and other service features, the price is fixed by each network operator. This restricts the scope for users to optimise the service to meet their particular needs, so limiting flexibility.

BRIEF SUMMARY OF THE INVENTION

According to the present invention, there is provided a communications system for use in a communications network comprising means for enabling a selection of network operators to provide services to a user based on user service requirements for each communication session, characterised in that the means for enabling comprise a digital marketplace that is operable to receive user service requirements from a user terminal, to negotiate terms of service and to dynamically select a network operator.

The present invention removes the necessity for users to commit to lengthy subscription agreements in order to operate in the communication system. This is achieved by the provision of the digital marketplace, in which user requirements are dynamically selected during the setting up of each communication channel and may continue to be dynamically selected during the communications phase if re-negotiation is permitted.

In mobile environments, a digital marketplace enables users to have access to a variety of networks and services and it allows users, service providers and network operators, in real time to interact and negotiate for appropriate communication links and quality of service. To the user, the digital marketplace appears merely as a pool of communication resources to tap into wherever and whenever possible.

The digital marketplace of the present invention incorporates a market provider with which a plurality of entities such as local network operators and service providers are registered, the market provider is organised to effect a logical market channel (LMC), comprising a plurality of control channels each of which is representative of a different communications technology, for intimating user requirements, the implementation of which is to be negotiated. This arrangement allows for the online availability of communication network services. A plurality of agents, each of which operates on behalf of an entity of the communication s network, negotiate within the digital marketplace for each contract tendered by a user.

The logical market channel allows users not attached to a particular network operator or service provider, and subscribers, that is users who have subscribed to a particular service provider or network operator, to communicate with the market provider of the digital marketplace.

By virtue of the digital marketplace a competitive and distributed environment with a level of quality, achievable by combining varied resources from different network operators, is realised. That is, the level of quality which may not be achievable by individual network operators on their own. The digital marketplace sets the foundation to permit: (i) disparate network infrastructures and communication services to evolve into an integrated digital infrastructure, and (ii) telecommunications services to be offered to customers competitively and in a distributed fashion.

It will be appreciated that the digital marketplace avoids the need for having "roaming contracts" between network operators for serving "roaming users". The term 'roaming' is a term of the art in mobile technology. By tendering contracts in local digital marketplaces, users can access services of locally registered network operators even if these operators have no roaming contracts with other organisations.

The digital marketplace enables open negotiations between service providers, customers and network operators, thereby increasing competition and hence delivering fairer pricing of telecommunications services to the end-customers. This allows the development of competitive pricing structures that are directly affected by the variation of demand and supply of communications services.

BRIEF DESCRIPTION OF THE SEVERAL VIEWS OF THE DRAWINGS

The present invention will now be described by way of example with reference to the accompanying drawings in which.

DETAILED DESCRIPTION OF THE INVENTION

Figure 1:
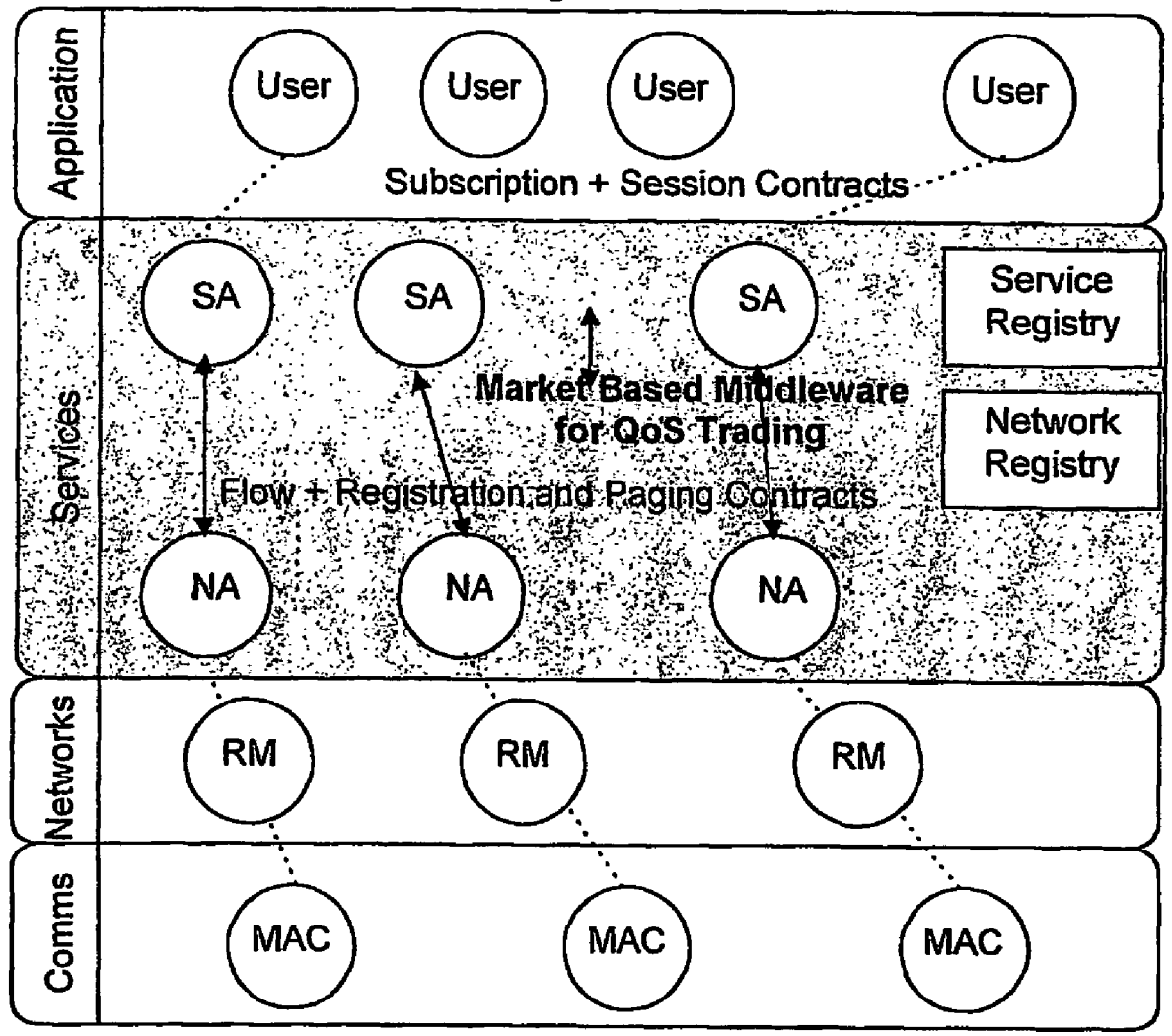
FIG. 1: shows a logical model of a communications environment in which a digital marketplace of the present invention is implemented.

FIG. 1 illustrates a logical model of the four-layer functional structure a wireless communications environment for the provision of telecommunications services in which a digital marketplace is implemented. The wireless communications environment comprises a Services layer situated between an Application layer (mobile user end) and a Network layer (network operator end), a Communications layer is disposed adjacent to the Network layer.

The Applications layer represents users of the communications network. The Services layer is an intermediary layer implemented as a logical representation of the digital marketplace within which dialogue is carried out between service provider agents, acting for service providers (not shown in FIG. 1), and network operator agents, acting for network operators (not shown in FIG. 1), on behalf of the users to establish a desired communication contract. An agent is a software program that acts in domain, in this case the Services Layer (i.e. the digital marketplace) on behalf of entities such as the network operators, service providers and users. A Service Registry and a Network Registry are located in the digital marketplace and keep a record of all service providers and network operators that are eligible to operate within that particular digital marketplace. The Network Layer represents the network operators with each Resource Manager (RM) corresponding to a particular network operator. By determining the available resources each RM controls the network agents, negotiating on behalf of the network operator. Medium Access Control entities (MAC) are located in the Communications layer and control the physical transactions which occur between the entities of each layer of the communication network.

A Logical Market Channel (LMC) (not shown in FIG. 1) communicates service requests, from users, to the digital marketplace (i.e. Services layer). The LMC allows the digital marketplace to be utilised by users choosing to negotiate a contract directly with network operators, as well as by subscribers, that is users who have agrees to a service contract with a particular service provider (subscribers are shown in FIG. 1 as users connected to a service agent by a dotted line).

In addition to the main contracts associated with the user traffic (Flow), other types contracts such as registration and paging contracts can be negotiated in the marketplace.

Figure 2:
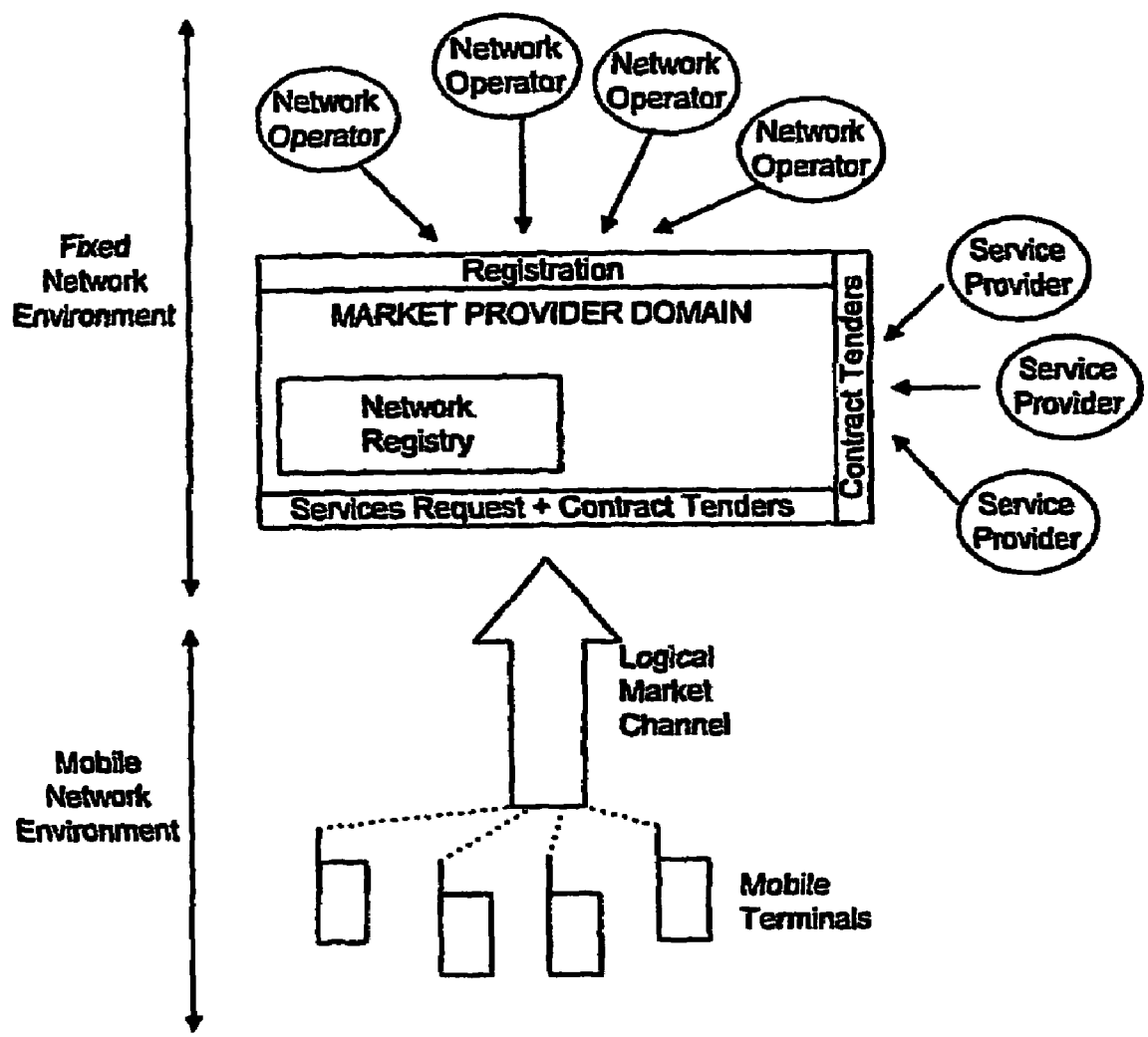
FIG. 2: shows a schematic model of a communications environment in which a digital marketplace of the present invention is implemented.
Figure 3:
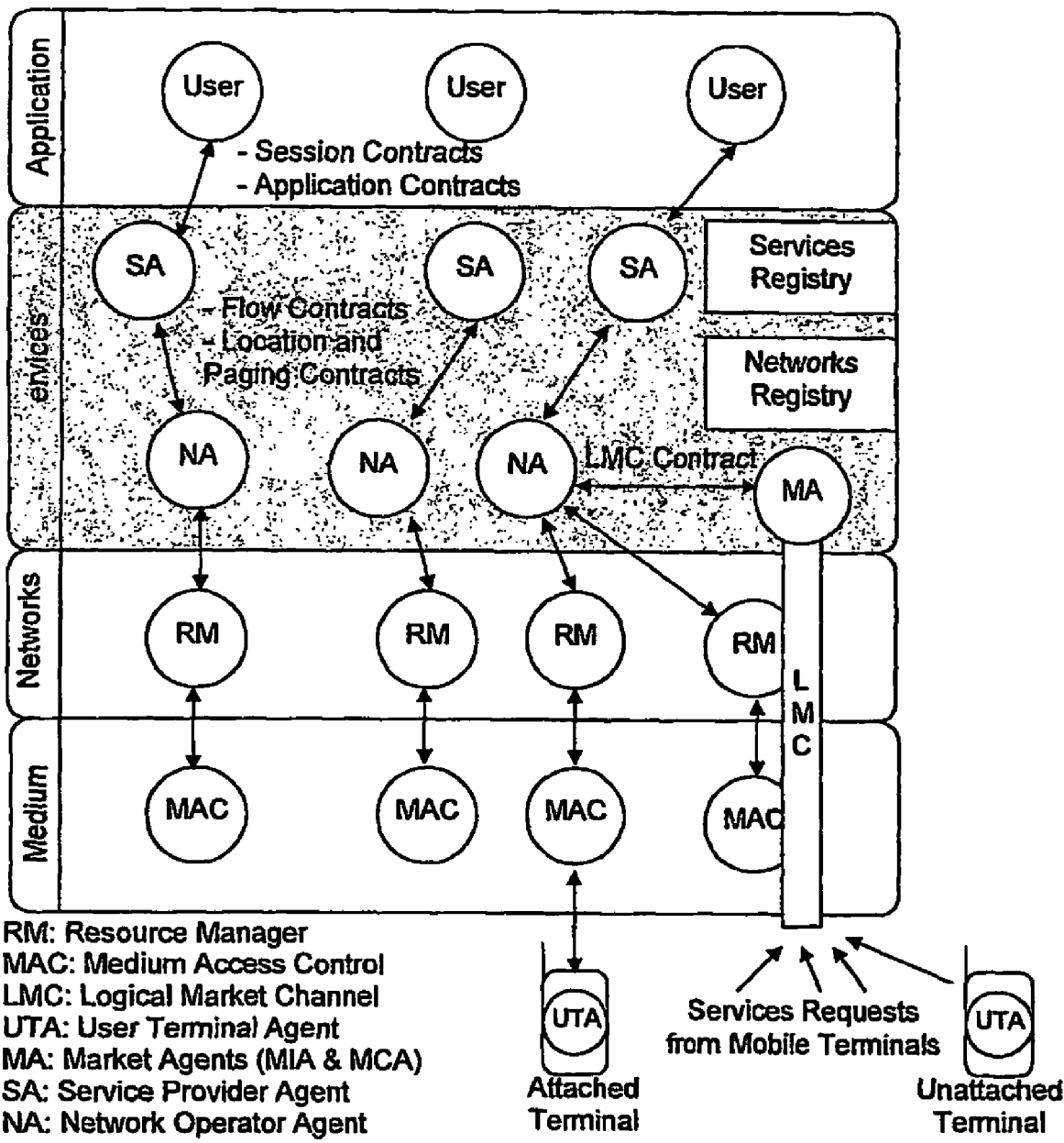
FIG. 3: shows a logical model of the communications environment of FIG. 1 incorporating features shown in the schematic model of FIG. 2.

FIG. 2 shows a schematic model of the communications environment of FIG. 1, with the digital market place represented by the market provider domain. FIG. 3 shows a combination of the features of FIGS. 1 and 2 to help clarify the arrangement of the communications environment.

The communications environment comprises a Fixed Network Environment and a Mobile Network Environment.

Within the Fixed Network Environment are a plurality of Network Operators and a plurality of Service Providers, each of which are linked with a Market Provider Domain, which may comprise one or more digital marketplaces, with each digital marketplace incorporating a market provider making negotiations possible. The market provider exists as an administrative entity for controlling and facilitating the transactions, of the at least one digital marketplace among other things, by managing or overseeing the necessary rules and protocols. In FIG. 2 the Market Provider Domain represents one digital marketplace.

The Mobile Network Environment comprises a plurality of mobile terminals, owned by users, which communicate with the market provider via a Logical Market Channel (LMC).

Each Network Operator owns a network infrastructure, i.e. a network of Satellite dishes, and is responsible for the transport of traffic generated by user communication sessions. Each Service Provider is an organisation that provides users with communications services such as voice and data communications, video-conferencing and Internet services. In the fixed environment, network operators register in the digital marketplace with the "Registration" Application Programmable Interface (API). Service providers tender contracts through the "Contract Tenders" API and users request services and tender contracts through the "Service Request+ Contract Tenders" API. The "Service Request+Contract Tenders" API is accessible through the LMC.

The selection of a network operator infrastructure is performed online by service operator agents acting on behalf of the service provider, or the user, negotiating with the network operator agents. The service provider agents negotiate for contracts according to price and service quality requirements which have been requested by a user or subscriber. If user is not attached to a network prior to the negotiations he does not have an explicit access to a network operator control channel and therefore cannot place a service request or tender a contract directly in the digital marketplace. Instead the market provider provides a support for the negotiations even without explicit network attachment for the user. This is achieved by the market provider server implementing a Logical Market Channel (LMC) and a network registry which enable a service/network evaluation to be carried out online by an unsubscribed user via a service provider, or by a service provider on behalf of a subscriber, alike.

The Logical Market Channel (LMC) is the means for subscribers, and users not attached to a network operator infrastructure or service provider, to place requests in the marketplace. A LMC is composed of several physical control channels, each channel is representative of a different communications technology such as satellite or land cellular radio (GSM900, DCS1800, PCS1900, TETRA, etc.). The LMC could be managed by one or more network operators. For that purpose, the market provider tenders EMC contracts to network operators via the digital marketplace. The LMC contracts may be tendered at marketplace initialisation, but this can be reviewed upon the inclusion of other network operators in the marketplace. Alternatively the LMC contract might be negotiated offline between the market provider and the network operators. The LMC contract specifies the channel capability in terms of geographical coverage and transmission capacity.

When a subscriber requests a communication service, the service provider, to which they have subscribed, negotiates with the network operators on their behalf in order to obtain a suitable contract. For every communication session, a subscriber establishes a session contract with his/her service provider. From the session contract, the service provider derives a set of flow contracts (for a single information flow) and/or multi-flow contracts (for multiple information flow). Each contract specifies the user requirements for one or more continuous media flows (audio, video, or data) and/or discrete media transfer (text, graphics, images, etc.) within the session. For each flow contract and multi-flow contract, the service provider announces (or "tenders") a call for a bid in a digital marketplace. Network operators registered in the marketplace will then compete for the contracts. Based on subscriber requirements (and other related criteria), the service provider selects the network operator(s) that will be contracted to support the communications session. Likewise, users could directly negotiate contracts with network operators if the service to be provided is not covered by a subscription with a service provider, alternatively particular service operators may have an agreement with a particular network operator in which case no negotiation is required.

Such contracts may explicitly state that the network operator would keep track of the user location over a geographical area and would also page the user terminal for incoming sessions.

It should be noted that digital marketplaces enables users such as registered individuals and organisations to negotiate and re-negotiate contracts, but once contracts have been agreed for a session, then, the transport of the user traffic is handled directly by the network operator infrastructures, without involving the digital marketplaces.

Each digital marketplace enables the trading of quality of service (QoS) sensitive telecommunications services within a particular geographical area. Several interconnected digital marketplaces may be setup to provide communications over some area, typically, but not restricted to, a city. A digital marketplace represents an infrastructure with interacting agents where local network operators, capable of supplying telecommunications services over a specific area, register in order to receive calls for bids from users and service providers. For instance, a city could be covered by three digital marketplaces—one marketplace for the residential area, a second marketplace for a business area with a specific area with a specific usage pattern and a third marketplace for a business area with a different usage pattern.

Figure 4:
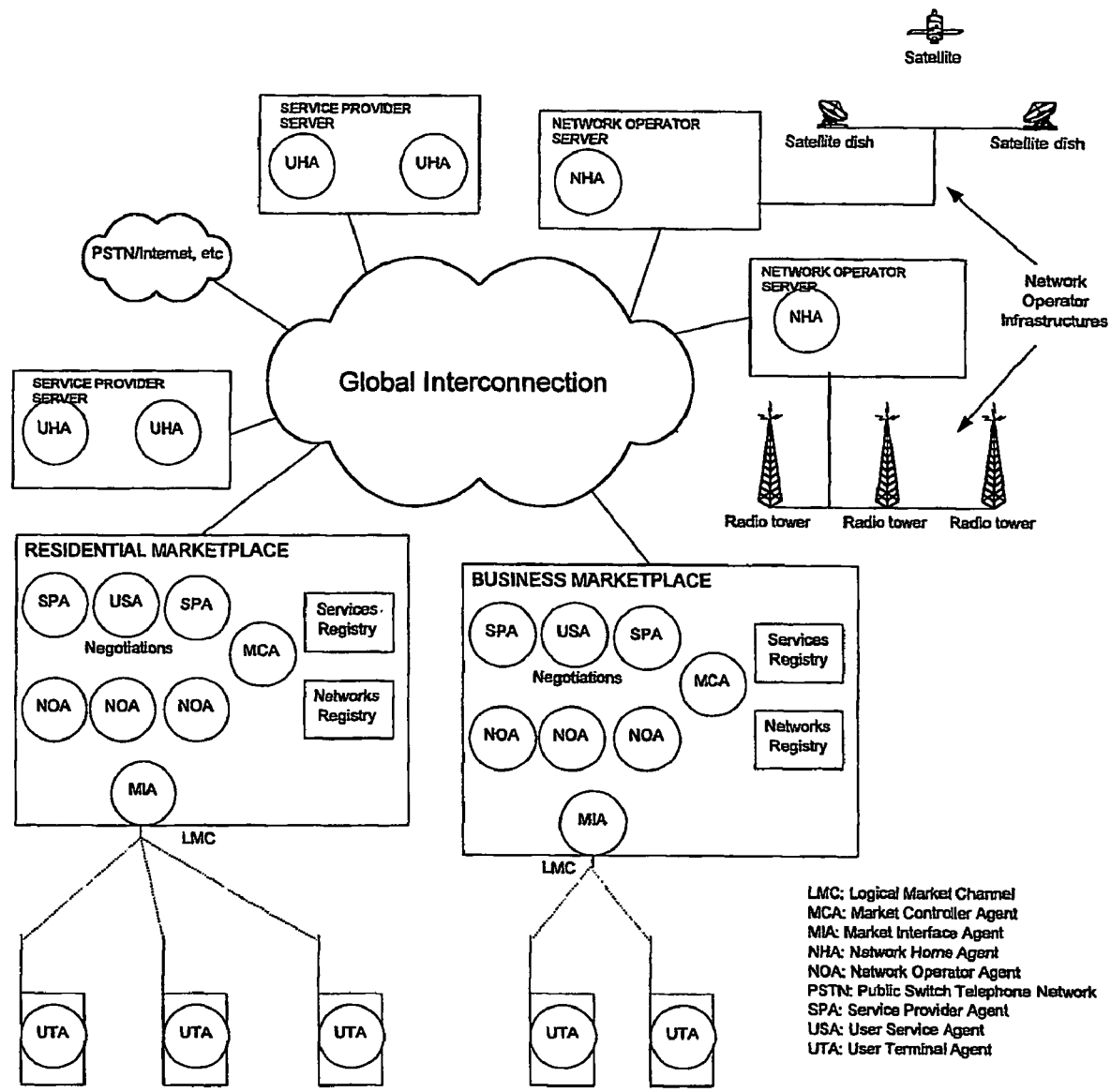
FIG. 4: shows a communications environment in which a plurality of the digital marketplaces of the present invention are implemented.

One implementation of a wireless network incorporating a plurality of such digital marketplaces is depicted by FIG. 4. Network operators interconnect their network infrastructures, such as satellite dishes or radio towers to the global interconnection. A network operator server populated with Network Home Agents (NHA) is situated between each network infrastructure and the global interconnection. Network operators' infrastructures are usually proprietary and dedicated to a specific communications technology such as satellite, cellular radio or cordless communications. Service provider servers are also connected to the global interconnection. In each of the service provider servers, a set of User Home Agents (UHA) is implemented. The global interconnection is interfaced to other networks such as the Public Switch Telephone Network (PSTN). Also connected to the global interconnection are a residential digital marketplace and a business digital marketplace which are managed by one or more market providers. In this application, a server implements each marketplace but other means of implementation are possible. Each marketplace server is populated by various agents, some owned or controlled by services providers and others owned by users. Interactions between agents are done locally in the marketplace server or over the global interconnection from remote servers i.e. network operator servers, service provider servers and user terminals. Agents located on user terminals can communicate with other agents located in marketplaces via the LMC.

It will be understood that in the foregoing, users, service providers, network operators and market providers are represented in the system by a set of agents. These agents may be static remaining within one hosting environment, alternatively they may be mobile moving from hosting environment to hosting environment. Each agent is, as was previously defined, a software program that acts in a digital domain on behalf of a user such as an individual or an organisation such as service provider or network operator. The various agents hosted by the communications environment as shown in FIG. 3 are:

The Network Home Agent (NHA). This is a stationary agent that runs on the network operator domain. If a network operator committed itself to a registration and paging contract with a service provider, then the associated NHA would manage the paging requests for mobile users covered by the contract. Conceptually, each network operator can own one NHA although in practice several NHAs could be distributed over the system for efficiency.

The User Home Agent (UHA). This is a stationary agent that runs on the service provider domain. The UHA handles all incoming session requests for a particular user. The UHA operates in conjunction with one or more NHAs for paging the associated mobile user. The UHA also handles requests generated by the user terminal and interacts with other agents active in the various marketplaces.

The Service Provider Agent (SPA). This is a mobile agent that migrates from the server provider domain to the market domain when there is a need to negotiate contracts locally on behalf of a user. The SPA acts on behalf of the user and the service provider but is owned by the service provider. Because the Service Provider is registered in the marketplace, a long term payment agreement may be implemented for the communication services utilised.

The User Service Agent (USA). This is uploaded directly from the user terminal to the marketplace. Once uploaded, the USA behaves similarly to the SPA but the USA pays the contracted parties directly with electronic payment at the end of the session, or pays regularly during the communications phase. Such process permits mobile users to access services that are not covered by their subscription contracts. The USA acts on behalf of the user.

The Network Operator Agent (NOA). This is a stationary agent that runs on the behalf of a network operator in the market provider domain. The NOA communicates with resource managers from the network operator's infrastructure in order to estimate what flows can be supported. NOAs propose bids to flow contracts that are tendered by SPAs and USAs. A network operator that wishes to trade over a particular geographical area registers NOAs in selected digital marketplaces that cover the desired geographical area. At registration, the NOA specifies what type of services it can support and what terminal capabilities are required from data stored in the network registry. The Network Registry also stores data regarding the history of a network operator fulfil contracts satisfactorily. In the case of a network operator failing to fulfil a contract satisfactorily a decommitment penalty is registered against that particular network operator. The network registry of each marketplace informs the users or service providers on the decommitment penalty of each network operator that is registered. The decommitment penalty permits differentiation between the Network Operators that fulfil their contracts from those that are less liable. This decommitment penalty information is used as a parameter of SPAs objective function to guide their choices during the negotiations.

The User Terminal Agent (UTA). This is a stationary agent that is active on the user terminal domain when the terminal is switched on. The UTA communicates with marketplaces via their respective LMCs. The UTA acts on behalf of the user.

The Market Interface Agent (MIA). This is a stationary agent that handles requests from agents located outside the marketplace (UHA and UTA) and agents located inside the marketplace (USA, SPA, and NOA) and facilitates the selection of agents from within and outwith the a particular marketplace. For example the MIA controls the movement of an agent for the business marketplace to the residential marketplace. The MIA acts on behalf of the market provider and runs in the market domain.

The Market Controller Agent (MCA). This is a stationary agent that resides in each digital marketplace. One function of the MCA is monitoring the contracts and updating the decommitment penalty field of the network registry according to what registered NOAs are achieving regarding the contract that they are committed to fulfil.

Figure 5:
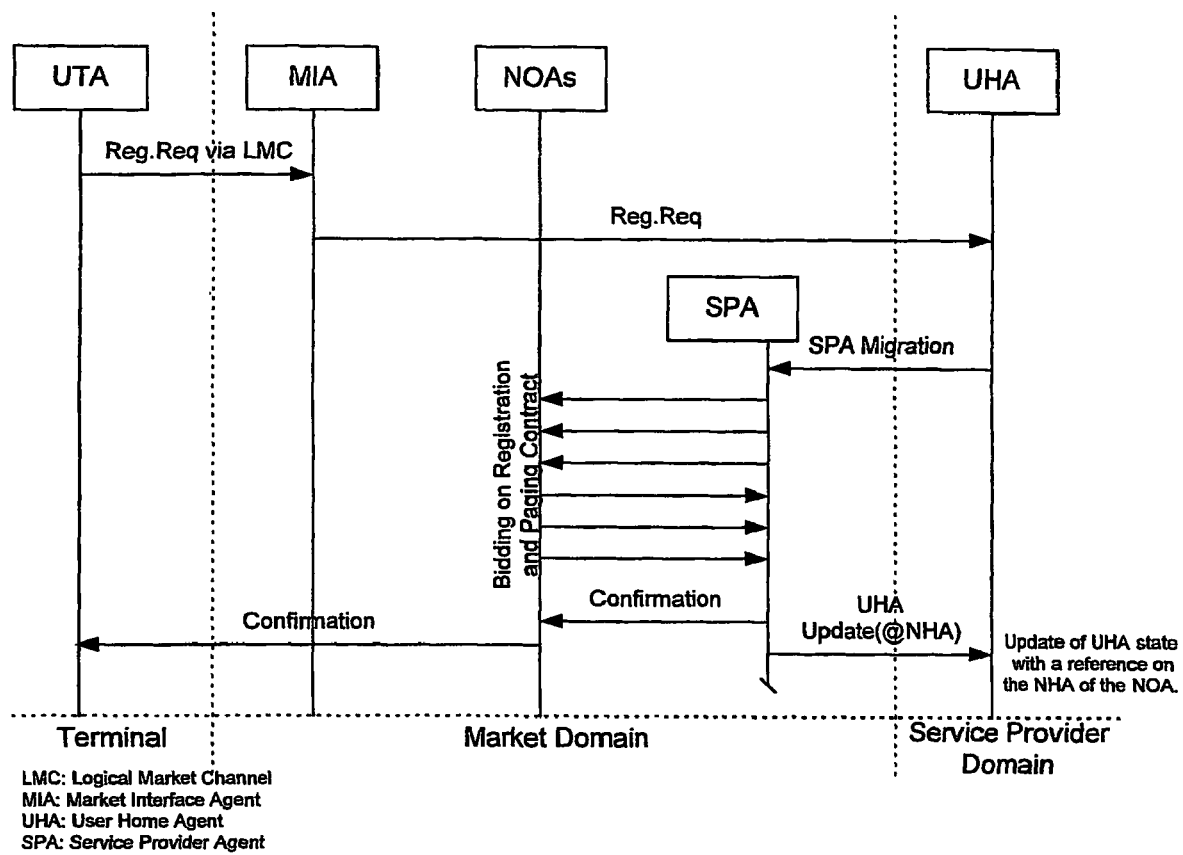
FIG. 5: shows a schematic representation of a registration procedure.
Figure 6:
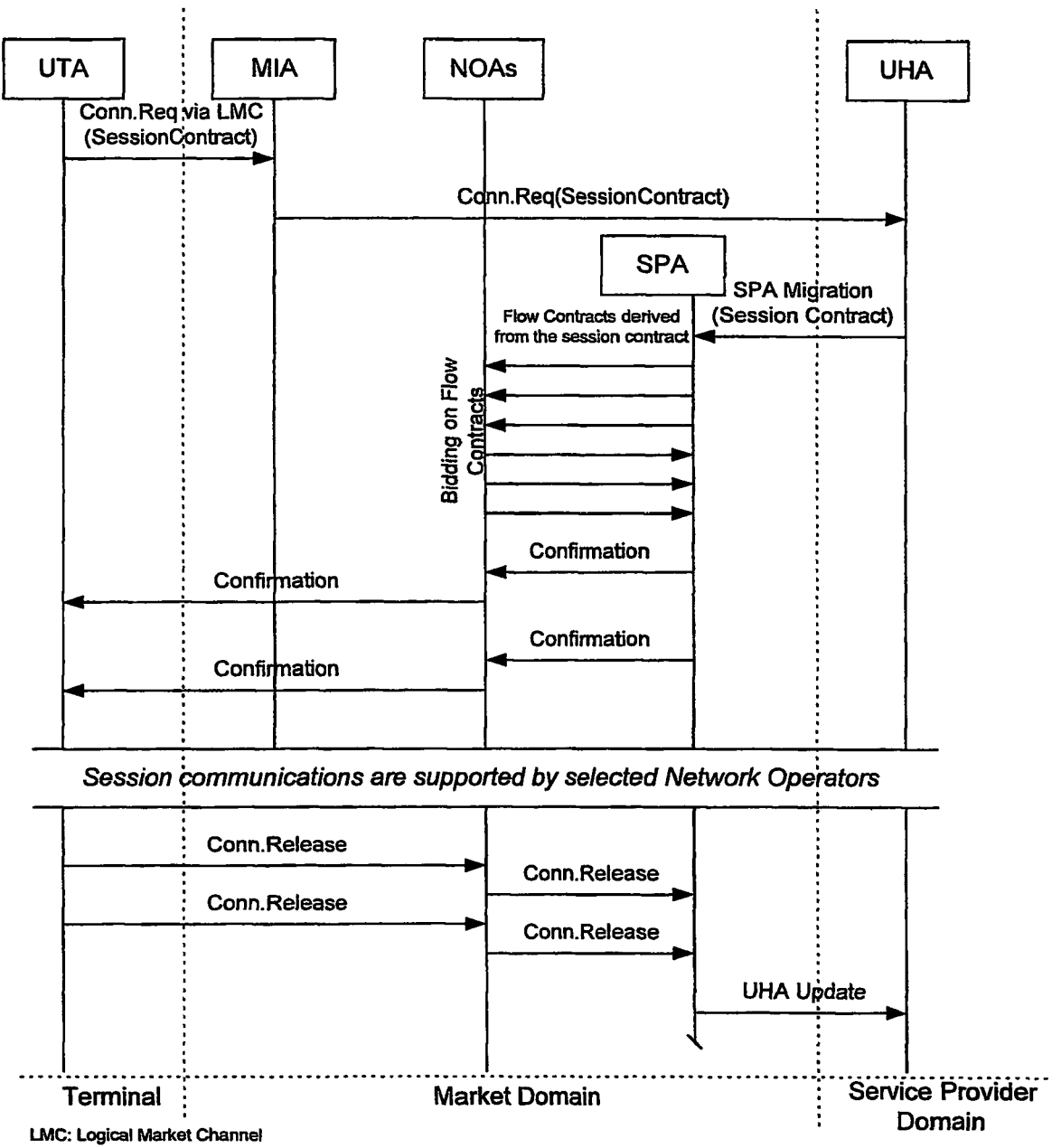
FIG. 6: shows a schematic representation of the establishment of an outgoing session controlled by a service provider.
Figure 7:
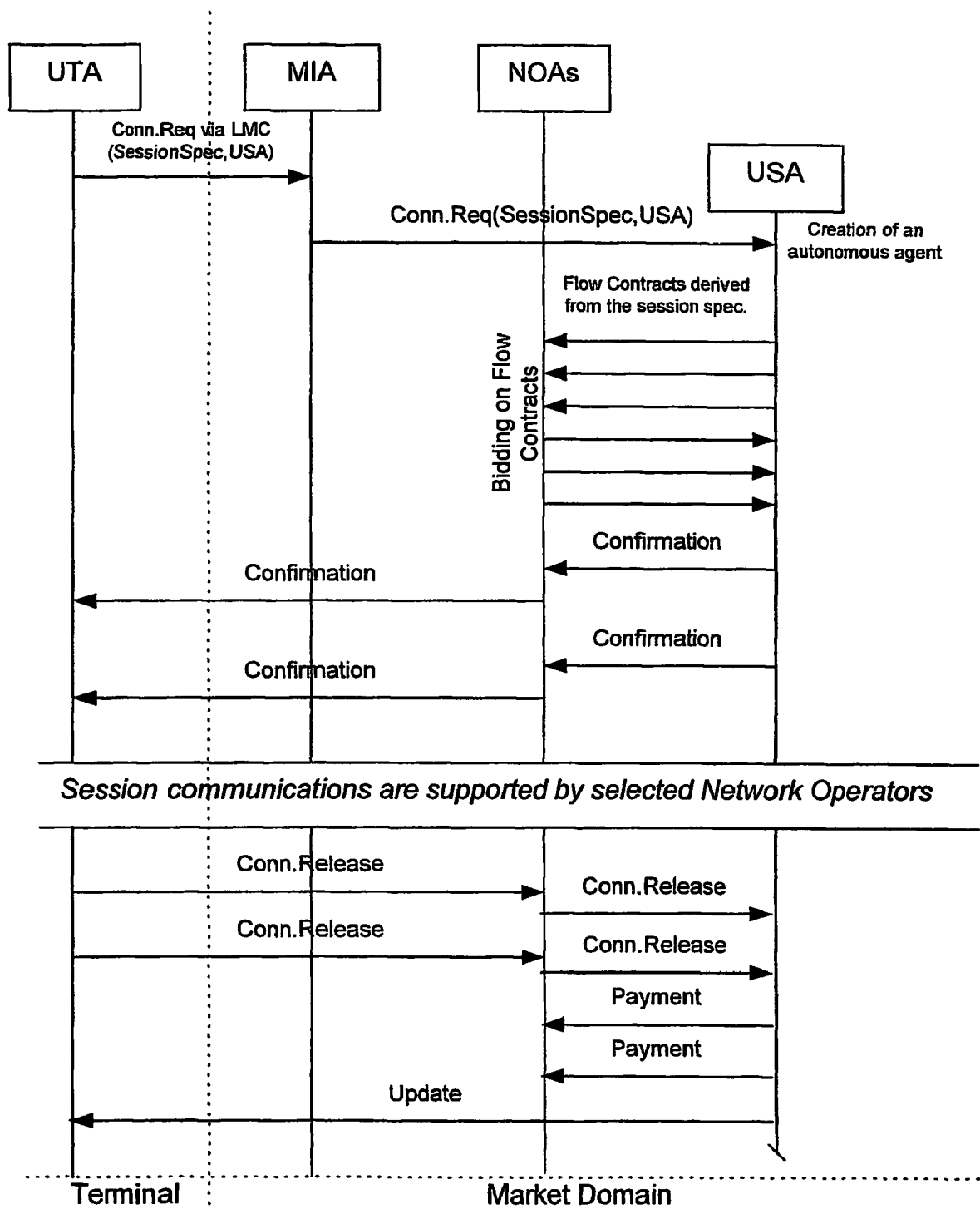
FIG. 7: shows a schematic representation of the establishment of an outgoing session not controlled by a service provider.
Figure 8A:
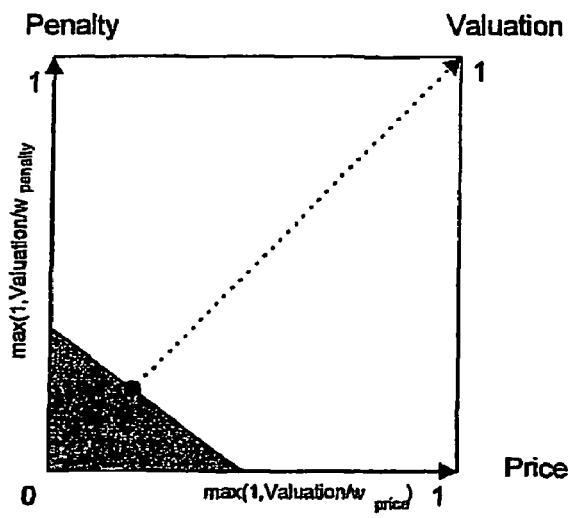
FIGS. 8 (a), (b), (c) & (d): show graphical representations of various Service Agent negotiation strategies.
Figure 8B:
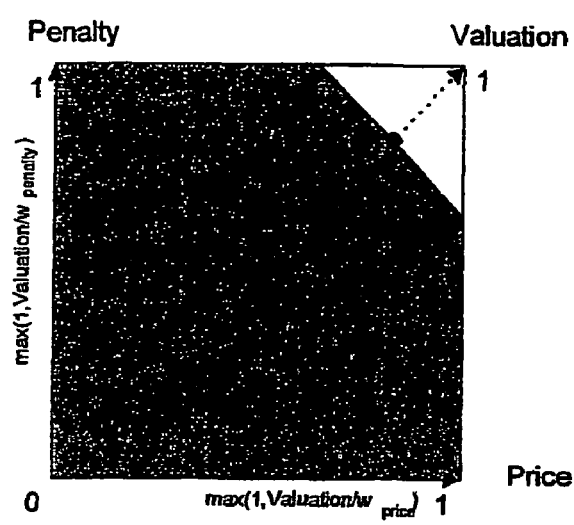
Figure 8C:
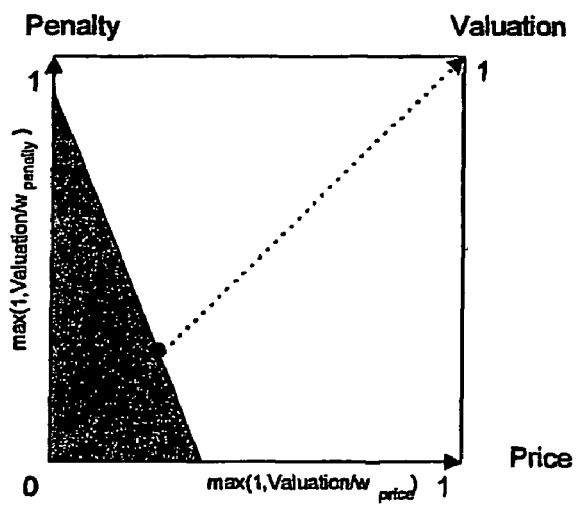
Figure 8D:
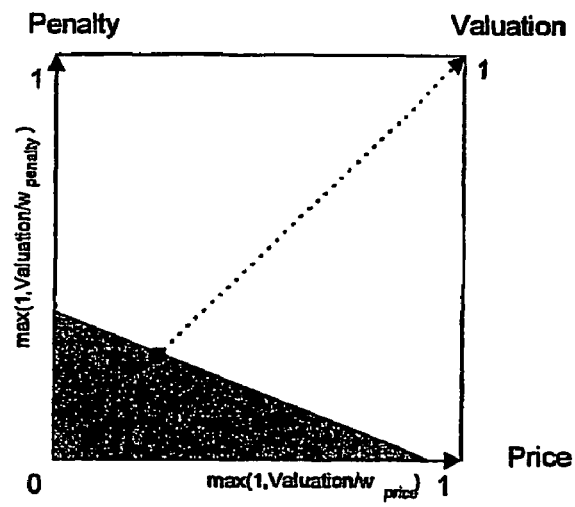

Operation of the present invention will now be described with reference to FIGS. 5, 6 and 7 involving different scenarios where interactions between agents are shown.

First Scenario: The Registration Procedure (FIG. 5)

The registration procedure enables a user to be paged for incoming sessions by a selected network operator. If the user is mobile then the selected network operator is also committed to keep track of the user location. The steps involved are:
1. The user switches the terminal on. The UTA (User Terminal Agent) located on the user terminal becomes active and sends a registration request (Reg.Req) to the MIA (Market Interface Agent) via the LMC (Logical Market Channel).
2. The MIA forwards the registration request to the UHA (User Home Agent). The UHA is active on the service provider domain. The UHA location is embedded in the registration request generated by the UTA.
3. The UHA migrates the SPA (Service Provider Agent) to the marketplace where the user is located.
4. The SPA tenders a registration and paging contract among the NOAs (Network Operator Agent) that are physically able to support this type of service.
5. The NOAs propose back bids on the contract.
6. The SPA selects the NOA that is the most suitable for supporting the registration and paging contract.
7. The NOA informs the UTA that it will page the terminal for incoming session requests.
8. The UHA state is updated by the SPA. In particular the location of the NHA (Network Home Agent) is kept for forwarding incoming session requests.
9. The SPA is removed from the marketplace.

Second Scenario: Establishment of an Outgoing Session (Controlled by the Service Provider) (FIG. 6)

In this scenario, the user establishes an outgoing session which is not paid directly in the marketplace but which will be paid later to the service provider. The required service is therefore covered by the subscription contract. However, a session contract is first accepted between the user and the service provider. The steps involved are:
1. The user generates a connection request (Conn.Req) through the LMC to the MIA. A session contract is embedded in the connection request.
2. The MIA forwards the connection request to the UHA (User Home Agent). The UHA is active on the service provider domain. The UHA location is embedded in the registration request generated by the UTA.
3. The UHA migrates the SPA (Service Provider Agent) to the marketplace where the user is located.
4. The SPA derives a set of low contracts from the session contract. The SPA tenders each flow contract to NOAs.
5. The NOAs propose back bids for the flow contracts.
6. The SPA selects the NOAs that are the most suitable to support the session.
7. NOAs that have been selected by the SPA to support the flows confirm to the UTA that the flows are established.
8. Once the session communication ends then the UTA releases each flow by sending connection release signals to the selected NOAs.
9. The NOAs inform the SPA that the session has ended.
10. The SPA updates the UHA state with the billing information related to the session.
11. The SPA is removed from the marketplace.

Third Scenario: Establishment of an Outgoing Session (Not Controlled by the Service Provider) (FIG. 7)

In this scenario, the user establishes an outgoing session which is paid directly in the marketplace. No session contract needs to be agreed between the user and a service provider but rather the user generates independently a session specification and resulting flow contracts are negotiated directly with the network operators. The steps involved are:
1. The user generates a connection request (Conn.Req) through the LMC to the MIA. A session specification and the code of the USA (User Service Agent) are embedded in the connection request along with a means of electronic payment.
2. The MIA creates an instance of the USA.
3. The USA split the session contract into flow contracts and tenders each flow contract among NOAs.
4. NOAs provide back bids on flow contracts.
5. The USA selects NOAs that are going to support the flows.
6. When the session communication ends, the UTA informs the selected NOAs (Conn.Release) that the flows can be released.
7. The NOAs inform the USA that the communication had ended.
8. The USA makes a final payment to the NOAs and returns any surplus to the UTA.
9. The USA is removed from the marketplace.

It should be noted that the third scenario describes a situation where the mobile user uses the network operator resources and makes electronic payments at the end of the session communication to the serving NOAs. If the user terminal is disconnected before the electronic payment is made then the NOAs will not be paid. In order to avoid this problem, the electronic payment could be performed directly after the contracts have been negotiated and before the communication starts or the payments could be done at specified intervals of time until the session is released. The payment mode is considered as one of the parameters of the flow contract and is negotiated between the USA and NOAs.

Fourth Scenario: Establishment of an Incoming Session

In this scenario, an incoming session from the fixed network reaches the UHA. First the UHA needs to page the mobile user. For that purpose, the UHA contacts the NHA that is contracted to keep track and page the mobile user when requested. The NHA requires one of its NOA that is active in the marketplace where the user is located to page the mobile user (or page directly the mobile user from its infrastructure). The mobile user replies to the paging request by generating a connection request (Conn.Req) through the LMC. The steps involved are:
1. An incoming session connection request reaches the UHA on the service provider domain.
2. The UHA requires the NHA that is contracted to page the mobile to send a paging request to the mobile user.
3. The NHA selects one of its NOA that is active in the marketplace where the user is located to page the mobile user. Another alternative is that the network operator uses its own infrastructure to page the mobile user.

4. The UTA on the user terminal is paged.
5. The UTA replies back by generating a connection request (Conn.Req) on the LMC.
6. The MIA receives the connection request and forwards it to the UHA.
7. The UHA migrates the SPA along with the session contract which was initially transmitted with the incoming session request.
8. The SPA splits the session contract into flow contracts and tenders each independent flow contract among NOAs.
9. NOAs generate back bids on the flow contracts.
10. The SPA selects one or more NOAs to support the session.
11. Each selected NOA confirms to the UTA that a connection is established on their respective infrastructure.
12. Once the session communication ends then the UTA release each flow by sending connection release signals to the selected NOAs.
13. The NOAs inform the SPA that the session has ended.
14. The SPA update the UHA state with the billing information related to the session.
15. The SPA is removed form the marketplace.

The following examples of negotiations between agents are provided to supplement the foregoing description and aid with the understanding of the invention. During the operation of the digital marketplace, negotiations take place between the Service Provider Agents (SPA) and the Network Operator Agents (NOA). These agents have various negotiation strategies which they perform within the marketplaces. SPA's would aim at obtaining the best combination of price and quality of service as defined in the contract as requested by a user. NOA's aim at maximising their revenue, with the proviso that if they should offer too high a service quality and are not able to fulfil the contract this will reflect on the decommitment as reported by the MCA. During negotiations SPA may also take into account the decommitment when choosing between bids from NOA's, as it can use this information to decide how likely it is that the agreed contract will in fact be met.

The strategies that NOA's could adopt during negotiations will now be detailed. It is possible for NOA's to individually adapt their prices according to a price refinement process, e.g. an convergent iterative process, thus ensuring each of them remains competitive and reactive to any changes in the supply/demand ratio of communication resources. In such an scheme, each NOA analyses negotiations that have occurred in the past in order to determine the market price they have to offer to remain competitive. During the negotiation, a NOA can either propose a connection or withdraw. Withdrawing from the negotiations means that there is an excess market demand for the resources that the Network operator has available, this means that the NOA can to increase its offered price due to the demand. If the NOA is able to offer a connection for the call tender which wins the tender then the NOA does not have to change the offered price. However, if the NOA is able to offer a connection but loses the call in the negotiation process to another NOA, then either the price offered was too high or the network's reputation, i.e. the decommitment level of the network was not good enough. A network agent updates the offered price according to these considerations. A suitable formula for doing this is as follows:

$$P_c^\alpha = P_{c-1}^\alpha + \frac{B_{Resource}^\alpha(A) - B_{Price}^\alpha(A)}{A} \cdot D$$

where $P_c^\alpha$ is the price offered by NOA $\alpha$, on behalf of a network operator $\alpha$ during negotiation c. A is an integer number of negotiations which have taken place and are being considered for the purpose of the present negotiation.

$B_{Resource}^\alpha(A)$ is the number of calls blocked because the network operator $\alpha$ was enable to offer a bid price, i.e. no resources were available, over the last A negotiations.

$B_{Price}^\alpha(A)$ is the number of calls blocked because network operators were enable to meet SPA valuations over the last A negotiations. r is the set of all network decommitments and $r_\alpha$ is the decommitment of network operator $\alpha$. D is a constant which represents the maximum price differential between two price updates and A represents the number of calls to be negotiated before the price can be updated.

$B_{Resource}^\alpha(A) - B_{Price}^\alpha(A)$ is an estimation of the imbalance between supply and demand. In the event where the agent does not meet the valuation the agent decreases its offered price meaning $B_{Resource}^\alpha(A) - B_{Price}^\alpha(A)$ has a negative value.

The strategies that SPA's could adopt during negotiations will now be detailed. The two main parameters available to the SPA's requiring the carriage of a particular service are price and decommitment. As an example of how the negotiation process can be undertaken, the choice between NOA's can be characterised by parameters such as valuation and assurance. The valuation parameter is the quantification, over a normalised scale from 0 to 1, of the user's desire to obtain the service, that is how much they are willing to pay. The assurance parameter defines the importance to the user that the contract will be fulfilled as negotiated, and relates to the user's willingness to select a network operator with regard to their decommitment record. A user requiring a high level of assurance would not select a network with a poor level of decommitment even if the price offered was low. The assurance is represented by two normalised strategic weights, $w_{price}$ for the price component, and $w_{penalty}$ for the decommitment component. The sum of these weights is equal to 1.

FIGS. 8(a-d) show different negotiation strategies and the bids in each case which are considered as acceptable by the service agent. Any point (x, y) in each of the boxes 8(a)-8(d), represents a possible NOA bid where x is the price offered and y, the associated network operator decommitment penalty reported by the MCA. The shade zone represent the set of all acceptable bids according to the user assurance and valuation weights. Increasing the acceptable valuation results in the zone of acceptable bids being extended. Varying the assurance rotates the line of the shaded area over the rotation point. The rotation point is represented on FIGS. 8(a)-8(d) by a black dot on the figure. FIG. 8(a) represents a strategy where the service agent has a low valuation for the service. FIG. 8(b) represents a strategy where the service agent has a high valuation for the service. FIGS. 8(c) represents a negotiation strategy with a preference for operators offering low service charges, for a given valuation weighting. By contrast FIG. 8(d) represents a negotiation strategy with a preference for operators that have a good market reputation, i.e. a low decommitment rating, for the same given valuation weighting of FIG. 8(c).

The negotiations which take place in the digital marketplace can be carried out as an auction. A sealed bid auction, where an NOA offer bids without knowledge of the other NOAs allows short negotiation overheads. However, other types of auction systems, such as the Vickrey auction, the Dutch auction or the English auction, could also be used. For example, in an English auction, NOAs would offer bids beating the current bid, i.e. by offering a lower cost, until only one bid remained. Alternatively, in a Dutch auction, the SPA would raise the price it was willing to pay until one NOA accepted the contract.

As has been detail previously, a record of each network operator decommitment is maintained by the market controller agent (MCA). A simple method of calculating decommitment is as follows:

$$r_\alpha(S) = \frac{\sum_{i=size(S)-d}^{size(S)} 1 - commitment(s_i)}{d}$$

where S is the time-sorted vector of communication sessions $s_i$ which have been admitted by NOA $\alpha$, $s_i(s_1 \epsilon S)$ is the $i^{th}$ session to have been admitted by NOA $\alpha$, $r_\alpha$ is the decommitment of network operator $\alpha$ and d is the penalty depth, that is the number of negotiations over which decommitment is measured. This decommitment penalty d could be all negotiations but, since communication network conditions change regularly, is more likely to be a relatively small proportion of them, such as number made in the last few minutes or hours. The function commitment is defined as 1 if the contract was fulfilled according to its specified conditions, and 0 otherwise.

It should be noted that in the communications system there is no requirement that all NOAs or SPAs form decisions about prices to offer, or contracts to accept, in the same way. It is possible for an NOA to offer a fixed price for all calls which it has resources to accept, although more complex strategies will recover higher revenues. Also, agreement as to what constitutes a contract is a matter between the SPA and the NOA. However, the concept of decommitment must be adhered to by all parties and data on this is held independently by the MCA.

Figure 9:
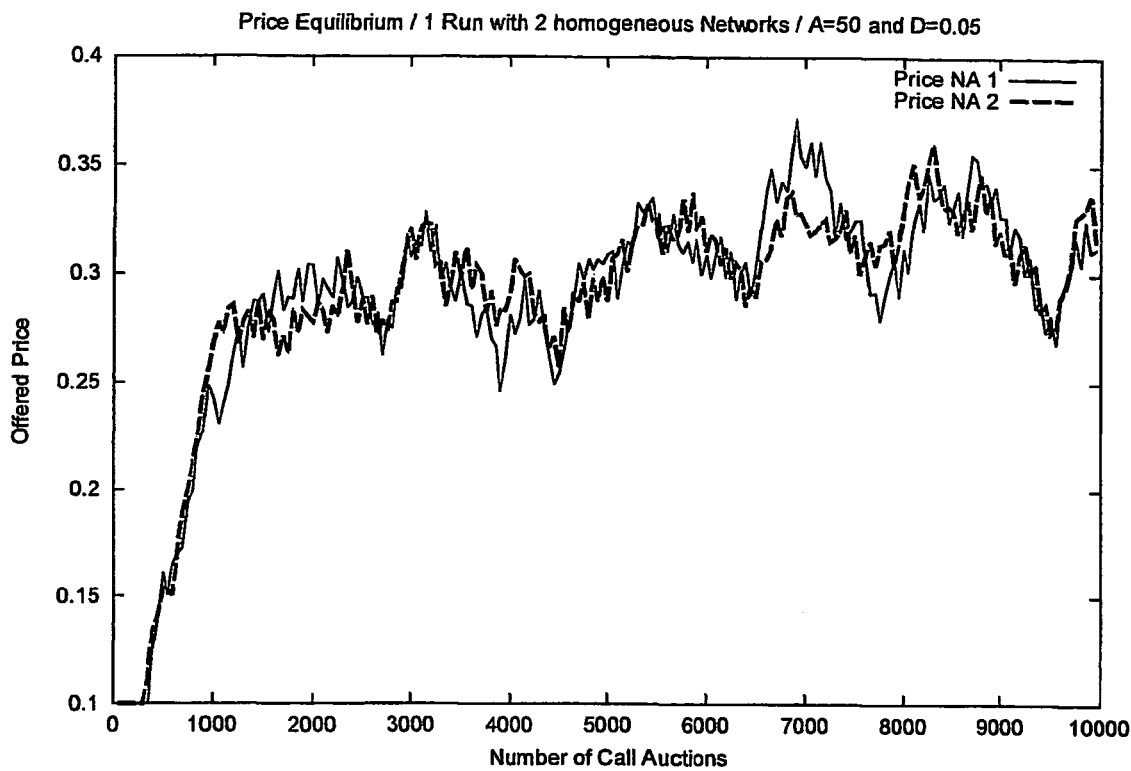
FIG. 9: shows a graphical representation of simulated results of one possible value based negotiation strategy.
Figure 10:
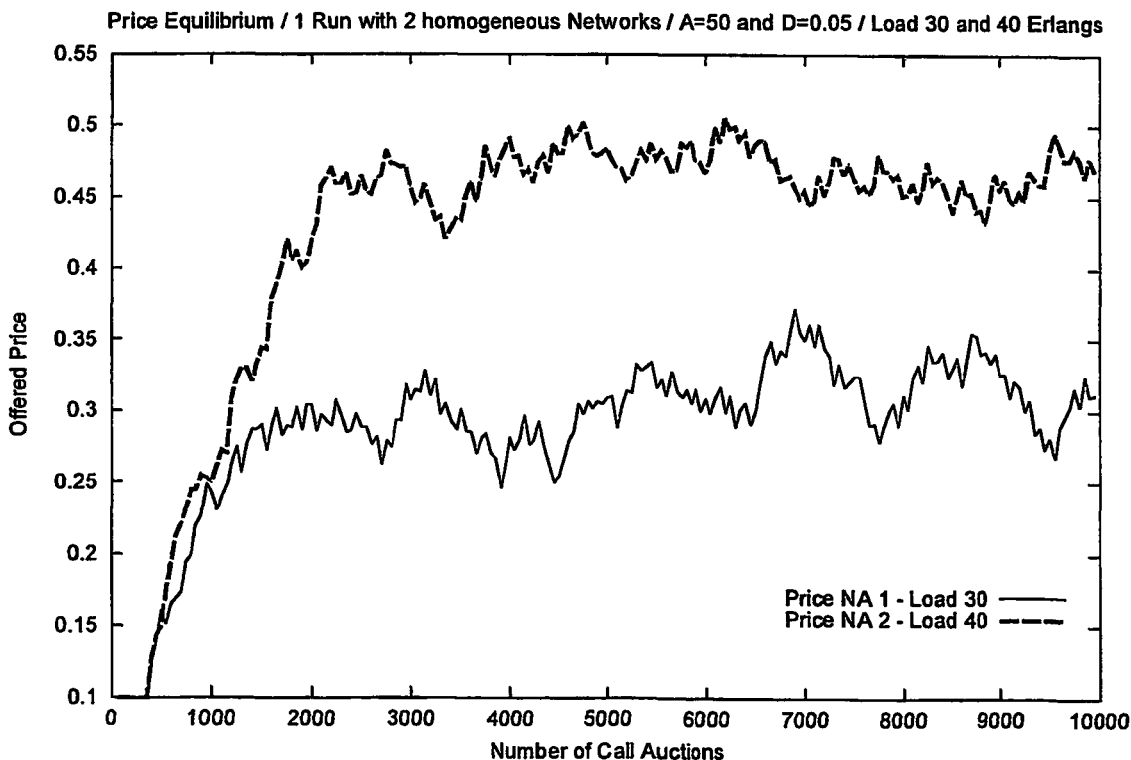
FIG. 10: shows a graphical representation of simulated results of a second possible value based negotiation strategy.
Figure 11:
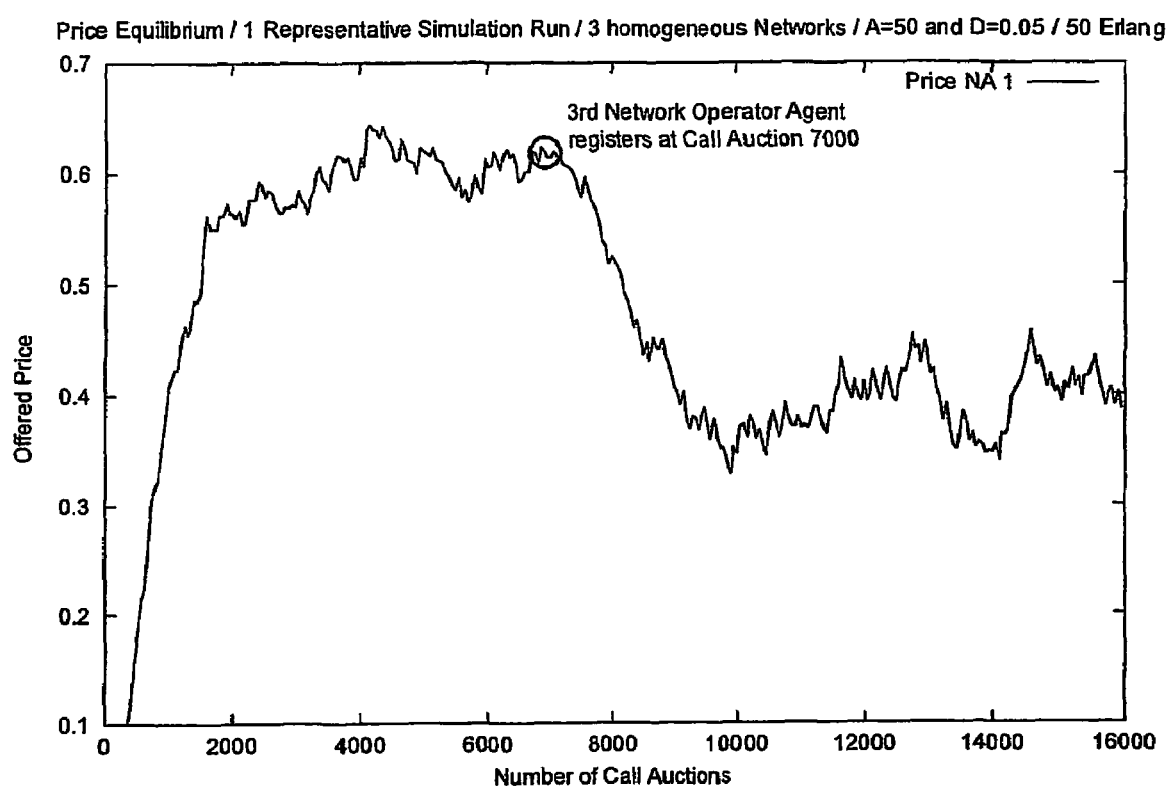
FIG. 11: shows a graphical representation of simulated results of a third possible value based negotiation strategy.

FIGS. 9, 10 and 11 show the results of simulation carried out when SPAs have valuation-based negotiation strategies. In this scenario, a SPA selects the NOA according to its preferences and valuation for the service. For the simulation results presented in these figures, the offered load is composed of penalty-conscious and price-conscious agents and the penalty depth is 200 i.e. decommitment is formed over the past 200 negotiations for a given network operator. SPA valuations are drawn from a uniform distribution ($0 \leq v \leq 1$). Call durations are exponentially distributed with a mean of 3 minutes and call/session admission requests enters the system according to a Poisson process.

FIG. 9 shows a the results of a representative simulation run. As can be seen, the results show the fluctuations in the offered price for two network operators equipped with the same network and call admission strategies. It is shown that the price offered by both operators is similar and reach a price equilibrium after around 9000 calls.

FIG. 10 shows a graphical representation of the price offered by a network operator when competing in a duopoly with two different offered loads. It can be seen that the offered price fluctuates around an average which is different for each offered load.

FIG. 11 shows a graphical representation of the price offered by a network operator when competing in a duopoly from call auction 1 to call auction 7000. At call auction 7000, a third network agent enters the system. With the introduction of the new network operator in the marketplace, the overall market supply increases (more resources are made available). Subsequently, the two first network agents update their offered prices until a new market equilibrium is reached. This illustrates that the system can cope with dynamically varying supply as well as demand.

The invention claimed is:

1. A communications system for use in a mobile communications network comprising means for enabling a selection of network operators to provide services to a user based on user service requirements for each communication session, wherein the user service requirements comprise at least a price requirement, wherein the means for enabling comprises a digital marketplace that is operable to receive the user service requirements from a user terminal, via a logical market channel, to negotiate a service contract with terms of service corresponding at least to the price requirement of the user service requirements, and to dynamically select a network operator, wherein the digital marketplace is configured to negotiate the service contract with a plurality of network operators, wherein the logical market channel is configured to allow users not subscribed to a network operator to place a request in the digital marketplace, and wherein negotiating the service contract comprises adapting at least the offered price of the terms of service for the service contract by at least one of the network operators.

2. A communications system as claimed in claim 1, wherein the digital marketplace is operable to negotiate the terms of service during set up of each communication session.

3. A communications system as claimed in claim 1, wherein the digital marketplace is operable to re-negotiate the terms of service during the communications session.

4. A communications system as claimed in claim 1, wherein the digital marketplace includes a market provider with which a plurality of entities such as local network operators and service providers are registered, the market provider providing the logical market channel (LMC), the logical market channel having a plurality of control channels, each of which represents a different communications technology for receiving the user service requirements.

5. A communications system as claimed in claim 4, wherein the logical market channel is further configured to allow subscribers of a network operator to communicate with the market provider of the digital market place.

6. A communications system as claimed in claim 1, wherein a plurality of agents, each of which represents an entity of the network, is arranged to negotiate within the digital marketplace for each contract tendered by a user.

7. A communications system as claimed in claim 1, wherein the digital marketplace includes a service provider agent (SPA) that is operable to negotiate the service terms.

8. A communications network that includes a communications system as claimed in claim 1.

9. A communications system as claimed in claim 1, wherein the logical market channel comprises at least two physical control channels, wherein the at least two physical control channels provide different communications technologies.

10. A communications system for use in a mobile communications network comprising:

means for enabling a selection of one of a plurality of network operators, wherein the selected network operator is configured to provide services to a user based on user service requirements for the communication session of the selection, wherein the user service requirements comprise at least a price requirement, wherein the selection of the network operator is made via a logical market channel, wherein the means for enabling comprises a digital marketplace configured to:
- receive the user service requirements from a user terminal,
- negotiate a service contract with terms of service corresponding to at least the price requirement of the user service requirements, and
- dynamically select a network operator, wherein the digital marketplace is further configured to negotiate the service contract with a plurality of network operators, wherein the logical market channel is configured to allow users not subscribed to a network operator to place a request in the digital marketplace, and wherein negotiating the service contract comprises adapting at least the offered price of the terms of service for the service contract by at least one of the network operators.

11. A communications system as claimed in claim 10, wherein the digital marketplace is operable to negotiate the terms of service during set up of each communication session.

12. A communications system as claimed in claim 10, wherein the digital marketplace is operable to re-negotiate the terms of service during the communications session.

13. A communications system as claimed in claim 10, wherein the digital marketplace includes a market provider with which a plurality of entities such as local network operators and service providers are registered, the market provider providing the logical market channel (LMC), the logical market channel having a plurality of control channels, each of which represents a different communications technology for receiving the user service requirements.

14. A communications system as claimed in claim 13, wherein the logical market channel is further configured to allow subscribers of a network operator to communicate with the market provider of the digital market place.

15. A communications system as claimed in claim 10, wherein a plurality of agents, each of which represents an entity of the network, is arranged to negotiate within the digital marketplace for each contract tendered by a user.

16. A communications system as claimed in claim 10, wherein the digital marketplace includes a service provider agent (SPA) that is operable to negotiate the service terms.

17. A communications system for use in a mobile communications network comprising:
means for enabling a selection of one of a plurality of network operators, wherein the selected network operator is configured to provide services to a user based on user service requirements for the communication session of the selection, wherein the user service requirements comprise at least a price requirement, wherein the means for enabling comprises a digital marketplace configured to:
- receive the user service requirements from a user terminal,
- negotiate a service contract with terms of service corresponding to at least the price requirement of the user service requirements, and
- dynamically select a network operator different from the network operator through which the user terminal is connected to the digital marketplace, wherein the digital marketplace is further configured to negotiate the service contract with a plurality of network operators, and wherein negotiating the service contract comprises adapting at least the offered price of the terms of service for the service contract by at least one of the network operators.

18. A communications system as claimed in claim 17, wherein the digital marketplace is operable to negotiate the terms of service during set up of each communication session.

19. A communications system as claimed in claim 17, wherein a plurality of agents, each of which represents an entity of the network, is arranged to negotiate within the digital marketplace for each contract tendered by a user.

20. A communications system as claimed in claim 17, wherein the digital marketplace includes a service provider agent (SPA) that is operable to negotiate the service terms.

* * * * *

UNITED STATES PATENT AND TRADEMARK OFFICE
CERTIFICATE OF CORRECTION

PATENT NO. : 7,570,944 B2
APPLICATION NO. : 10/240516
DATED : August 4, 2009
INVENTOR(S) : Dunlop et al.

It is certified that error appears in the above-identified patent and that said Letters Patent is hereby corrected as shown below:

Title page,
Item (86), "Feb. 21, 2004" should read --Feb. 21, 2003--.

Signed and Sealed this

Eighth Day of December, 2009

David J. Kappos
*Director of the United States Patent and Trademark Office*